July 14, 1970   D. GRINGER   3,520,059
KNIFE HANDLE FOR ADJUSTABLE BLADE
Filed Oct. 5, 1967
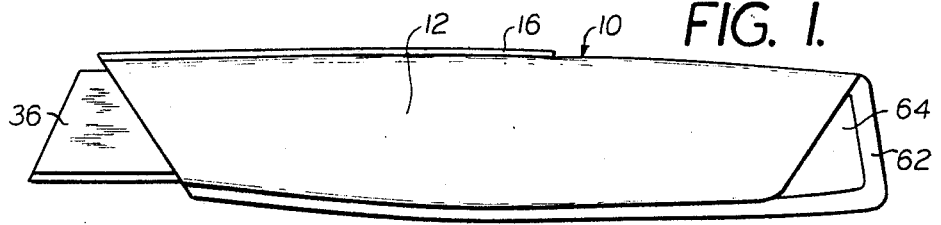
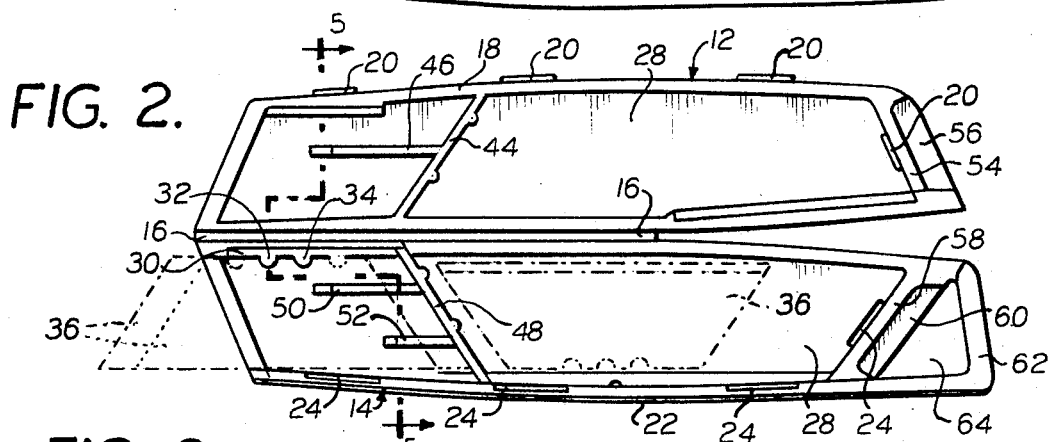
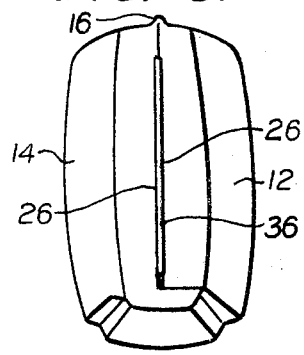
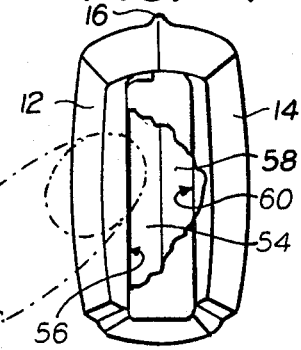
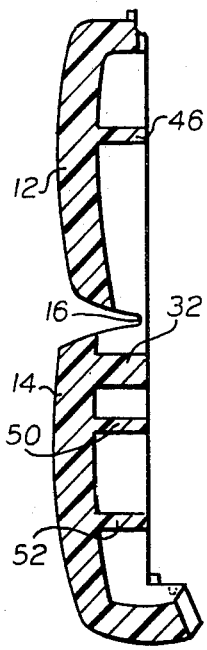
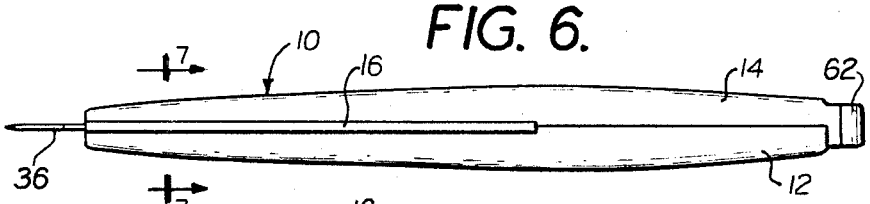
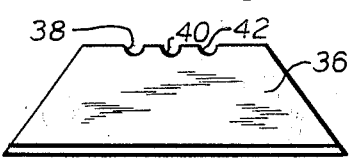
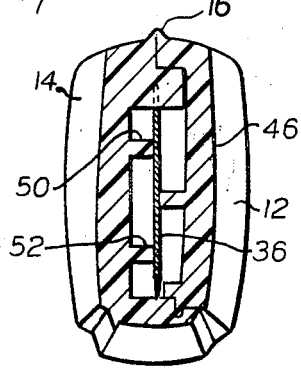
INVENTOR
DONALD GRINGER
BY
ATTORNEYS

United States Patent Office 3,520,059
Patented July 14, 1970

---

3,520,059
KNIFE HANDLE FOR ADJUSTABLE BLADE
Donald Gringer, West Nyack, N.Y., assignor to Allway Tools, Inc., Bronx, N.Y., a corporation of New York
Filed Oct. 5, 1967, Ser. No. 673,159
Int. Cl. B26b *1/00;* B25g *3/38*
U.S. Cl. 30—293                                                2 Claims

ABSTRACT OF THE DISCLOSURE

Handle for a knife blade. Includes a pair of complementary shells, a hinge integral with the shells and secured to one side of each of the shells, and means for detachably securing the other sides of the shells to one another so as to form a casing for a knife blade.

BACKGROUND OF THE INVENTION

Field of the invention

This invention is in the field of handles for knife blades. In particular, this invention provides a handle for a knife blade which results in a safety knife wherein, when the knife blade is not disposed in the handle for cutting, it may be stored therewithin.

Description of the prior art

Knife handles with adjustable blades have long been known in the art. The combination of knife blade and handle is typically referred to as a "utility knife." Heretofore utility knives generally have been characterized by a construction wherein two separate complementary shell are secured together, as by a nut and bolt, to form a casing for a knife blade. A carriage for the knife blade is mounted within the casing for slidable longitudinal movement therein. Accordingly, when the knife blade is mounted on the carriage and the carriage is moved forwardly within the casing, a portion of the blade will protrude beyond a frontal opening within the casing to provide a cutting surface. When no further use of the knife blade is required, the carriage is moved rearwardly within the casing, thereby retracting the knife blade so that it is disposed wholly within the casing. In order to change the knife blade when it becomes dulled, the means securing the two shells to one another, typically a nut and bolt, are separated, as by a screwdriver, the shells are separated, the worn blade is removed and replaced with a fresh blade, and the shells are then again brought together and resecured.

Patents typifying prior art utility knives of the foregoing type include the following: 2,862,296; 2,948,961; 3,062,147; 3,107,426 and 3,192,624.

While utility knives of the foregoing type are advantageous in that they permit ready placement of the knife blade in cutting position along with convenient internal storage of the blade within the casing when not in use, they also exhibit a number of disadvantages. For instance, it has been somewhat inconvenient for the user to replace a used blade with a fresh blade, in that he must first separate the shells by means of detaching the securing means. This invariably requires a tool of some sort, most typically, a screwdriver to remove the bolt from the nut. This operation, while simple, is somewhat tedious and time consuming for the user.

In addition, the manufacture of utility knives of the foregoing type is relatively expensive, not only as regards fabrication of the shells, which characteristically are made of metal, but also in the provision of appropriate securing means. In addition, the construction requirements for the carriage for the knife blade are precise and exacting, and hence, expensive.

SUMMARY OF THE INVENTION

I have devised a handle for a knife blade that obviates virtually all of the foregoing disadvantages encountered with prior art utility knives. My handle includes a pair of complementary shells, a hinge integral with the shells and secured to one side of each of the shells, and means for detachably securing the other side of the shells to one another so as to form a casing for the knife blade.

While the shells and integral hinge may be made out of a suitable metal, I find it distinctly preferable to fabricate them out of a plastic, for the reasons discussed in detail hereinafter.

In accordance with my construction, when the shells are secured to one another to form the casing, they define a frontal opening therebetween for receiving a knife blade, and additionally define an internal chamber for storage of (1) the knife blade when not in use and/or (2) a reserve supply of fresh blades. In accordance with my construction, there is additionally provided within the shells means whereby a knife blade may be mounted on the casing such that a portion of the blade extends beyond the frontal opening in cutting position.

BRIEF DESCRIPTION OF THE DRAWING

My invention will be best understood from the following detailed description, taken in conjunction with the accompanying drawing, wherein:

FIG. 1 is a side elevational view of my utility knife handle and shows a knife blade mounted in cutting position;

FIG. 2 is a plan view showing the shells of my handle hinged to one another and in an open position;

FIG. 3 is a frontal end view of the utility knife handle shown in FIG. 1;

FIG. 4 is a rear end view, in partial section, of the utility knife handle of FIG. 1;

FIG. 5 is a sectional view taken along the line 5—5 of FIG. 2;

FIG. 6 is a top view of the utility knife of FIG. 1;

FIG. 7 is a sectional view taken along the line 7—7 of FIG. 6; and

FIG. 8 is a plan view of a knife blade suitable for use in my utility knife.

DESCRIPTION OF THE PREFERRED EMBODIMENTS

Referring now to the drawing, FIG. 1 shows my knife handle, generally designated by the reference numeral 10. As shown in FIG. 2, the handle includes a pair of shells 12, 14. These shells are secured to one another at one side thereof by means of hinge 16.

Of particular importance is the fact that hinge 16 is integral with shells 12 and 14. That is, shells 12 and 14 are secured to one another at one side thereof through hinge 16 to provide a single unitary piece. As previously noted, while this unitary piece may be fabricated from metal, I have found it particularly advantageous to form this piece out of a plastic material. Such forming may be readily effected by molding of the plastic.

The plastic should be characterized by toughness and resilience. The hinge 16 should be resilient and possess high resistance to flexural fatigue. Thermoplastic resins are particularly suitable for use as the plastic material. Such thermoplastic resins include polyolefins such as polyethylene, polypropylene, or the like; polyoxymethylenes; vinyls such as polyvinylchloride or copolymers of vinyl chloride with another ethylenically unsaturated comonomer copolymerizable therewith such as, e.g., vinyl acetate, etc. Polyethylene and propylene have been found to be particularly suitable plastic materials.

Means are provided for detachably securing the sides of the shells that are remote from the hinge to one another. Thus, side 18 of shell 12 is provided with a plurality of upstanding tabs 20. Correspondingly, side 22 of shell 14 is provided with a plurality of recesses 24 along the inner edge thereof, these recesses being registrable with their respective tabs 20 and adapted to receive tabs 20 when shells 12 and 14 are swung together about hinge 16.

When shells 12 and 14 are brought together and detachably connected by disposing tabs 20 in recesses 24, they form a casing and define a slotted frontal opening 26 (FIG. 3) therebetween. Each of the inner sides of sheels 12 and 14 is provided with an internal recess 28. Accordingly, when shells 12 and 14 are detachably secured to one another by disposing tabs 20 in their corresponding recesses 24 so as to form the casing, such casing contains an interior chamber made up of internal recesses 28. The chamber is of a size sufficient to store one or more knife blades.

As is best seen in FIG. 2, means are provided within shells 12 and 14 for mounting a knife blade such that a portion of the blade will extend beyond the frontal opening of the closed casing. Thus, a longitudinal rib 30 is secured to and extends outwardly from the interior of shell 12. Advantageously, this rib is integral with shell 14. A pair of rounded lugs 32, 34 are secured to and extend downwardly from rib 30. A knife blade 36 which is to be utilized in conjunction with my knife handle is provided with a plurality of rounded cut-outs 38, 40, 42. Accordingly, the position of the knife blade may be readily adjusted by matching the first two cut-outs 38, 40 or the last two cut-outs 40, 42 with lugs 32, 34, the latter matching leading to a relatively greater degree of extension of the knife blade beyond the frontal opening 26.

In order to insure that a knife blade disposed in cutting position in my knife handle will be held firmly, each of shells 12 and 14 is provided, on the interior thereof, with ribs which cooperate to hold the knife blade firmly in position. Thus, in the interior of shell 12 there is provided not only a lateral reinforcing rib 44, but also a rib 46 extending forward longitudinally therefrom. Similarly, on the interior of shell 14 there is provided a lateral reinforcing rib 48 along with a pair of forwardly extending longitudinal ribs 50, 52. As shown in FIG. 7, ribs 50 and 52 are coplanar. When shells 12 and 14 are detachably secured to one another, rib 50 is disposed above rib 46 and rib 52 is disposed therebelow, thereby defining a firm support for blade 36 (FIG. 7).

It will of course be apparent that while the various ribs 44, 46, 48, 50 and 52 may be fabricated separately from the shells 12 and 14 and then secured thereto, it is advantageous to form the entire assembly integrally, whereby these ribs will be integral with their respective shells.

When shells 12 and 14 are secured to one another to form a casing for a knife blade, means are provided for readily detaching those sides of the shells secured by tabs 20 and recesses 24. To that end, the rear portion of shell 12 is cut out so as to form a space or opening, this opening being bounded on one side by a rib 54 and on another side by inner rear edge 56 of shell 12. Similarly, a cut out is provided in the rear portion of shell 14 so as to define a space or opening bounded on one side by a rib 58 and on another side by the inner rear edge 60 of shell 14. Accordingly, and as best seen in FIG. 4, when shells 12 and 14 are detachably secured to one another the space or opening defined by inner rear edge 56, ribs 54 and 58, and inner rear edge 60, is of sufficient size to permit entry therein of a fingertip, so that the user may readily open the casing by merely exerting pressure against inner rear edges 56 and 60. Such pressure will release tabs 20 from recesses 24 so that the casing may easily be opened by swinging shells 12 and 14 away from one another on their hinge 16.

It is advantageous to provide my knife handle with a hanger so that it may be easily hung up when not in use. To that end, I provide an elbow 62 which is secured to the rear of shell 14. The elbow 62 may be fabricated separately and then attached to shell 14, but it is preferable to make the entire assembly a single integral piece, wherein the elbow is formed integrally with shell 14. The securing of the ends of elbow 62 to the rear portion of shell 14 results in an aperture 64 therebetween. Accordingly, my knife handle may be readily hung up and stored when not in use, as by disposing the aperture over a nail mounted on a wall so that the elbow serves as a hanger for the handle.

Note the elbow 62 serves a second function, apart from providing means for hanging the handle. Thus, the elbow provides what is in effect an extension of inner rear edge 60, thereby enabling the user who wishes to open the casing to obtain greater leverage when inserting a fingertip into the space between inner rear edges 56 and 60.

It will be apparent that my knife handle affords a number of advantages as compared to utility knife handles heretofore taught by the prior art. Inasmuch as my handle may be made as a single unitary piece, this vastly simplifies fabrication techniques and results in substantial economies. Additionally, no tool whatsoever is needed to open the casing so as to either store a blade when not in use or to replace a used blade with a fresh blade—the mere pressure of a fingertip suffices.

A further advantage in my knife handle is that the presence of a carriage for the knife blade that moves longitudinally of the knife handle may be avoided. Heretofore such a carriage was considered a necessity in order to provide for prompt movement of the knife blade from a cutting position to a safe position within the interior of the handle. Prompt movement from one such position to the other was not possible in the absence of a carriage, because it would necessitate the use of a screwdriver or other tool to remove nut and bolt securing the two shells making up the casing, removing the blade from a cutting position and inserting it within the casing (or vice versa), thereafter again placing the shells in complementary relation, and securing them in such position by the nut and bolt. By contrast, in accordance with my construction, one need not employ a carriage for the knife blade, inasmuch as the blade can be promptly moved from cutting position to storage position (or the reverse) by simply exerting the pressure of the fingertip to swing open the shells on their hinge, removing the blade from the cutting position and laying it within the interior storage space, and snapping the shells together.

Variations can, of course, be made without departing from the spirit of my invention.

Having thus described my invention, what I desire to secure and claim by Letters Patent is:

1. A knife comprising
    (1) a resilient plastic handle,
    (2) a blade unconnected with said handle, said handle comprising
        (a) a pair of elongated complementary shells, (b) a one-piece hinge integral with both of said shells, secured to one side of each of said shells, and extending longitudinally with said shells, and (c) means for detachably securing the other sides of said shells to one another to thereby form a casing for said knife blade, said shells, when secured to one another to form said casing, defining a frontal opening therebetween for receiving said knife blade, and (3) means on said knife blade and means inside said shells cooperating to detachably connect said knife blade to said handle in a position where a portion of said blade is in said handle and another portion extends outwardly of said handle through said frontal opening.

2. The knife of claim 1 wherein at least one of said shells is provided along an edge thereof with a cut-out therein to define a space adapted to receive the tip of a finger, whereby when said shells are secured to form said casing a finger may be inserted in said space and force may be applied to said shells to detach the sides thereof and open said casing.

References Cited

UNITED STATES PATENTS

| 861,789 | 7/1907 | Zimmer | 30—153 |
| 2,679,100 | 5/1954 | Ehler | 30—337 |
| 3,068,569 | 12/1962 | Campbell | 30—153 X |
| 3,192,624 | 7/1965 | Gringer | 30—293 X |

LESTER M. SWINGLE, Primary Examiner

J. C. PETERS, Assistant Examiner

U.S. Cl. X.R.

30—340